United States Patent

Wissbrock et al.

[11] Patent Number: 5,078,190
[45] Date of Patent: Jan. 7, 1992

[54] TIRE TREAD

[75] Inventors: Horst Wissbrock; Heinrich Decker, both of Garbsen; Helmut Gaus, Neustadt; Werner Knauf, Wunstorf; Heinrich Huinink, Garbsen; Daniel Pfaff, Burgwedel, all of Fed. Rep. of Germany

[73] Assignee: Continental Aktiengesellschaft, Hanover, Fed. Rep. of Germany

[21] Appl. No.: 635,722

[22] Filed: Dec. 28, 1990

[51] Int. Cl.$^5$ .............................................. B60C 11/06
[52] U.S. Cl. .............................. 152/209 R; D12/147
[58] Field of Search ...................... 152/209 R, 209 D; D12/142, 144, 146, 147, 148

[56] References Cited

U.S. PATENT DOCUMENTS

| D. 250,405 | 11/1978 | Nyblom | D12/146 |
|---|---|---|---|
| D. 278,220 | 4/1985 | McDonald | D12/151 |
| D. 306,276 | 2/1990 | Graas | D12/147 |
| D. 308,190 | 5/1990 | Fetty et al. | D12/147 |
| 4,913,208 | 4/1990 | Anderson et al. | 152/209 R |

FOREIGN PATENT DOCUMENTS

| 3445041 | 6/1986 | Fed. Rep. of Germany | 152/209 R |
|---|---|---|---|
| 0060308 | 3/1986 | Japan | 152/209 R |
| 0071708 | 4/1987 | Japan | 152/209 R |

Primary Examiner—Michael W. Ball
Assistant Examiner—Nancy T. Krawczyk
Attorney, Agent, or Firm—Robert W. Becker & Associates

[57] ABSTRACT

A tire tread of a vehicular tire has, in a peripheral tire direction, a plurality of tread block rows that are separated from one another by wave-shaped longitudinal grooves arranged essentially in the peripheral tire direction. The individual tread blocks within each individual tread block row are separated form one another by transverse grooves, whereby the transverse grooves are arranged such that in a left tread half as well as in a right tread half the transverse grooves are aligned with one another. The groove center lines of the transverse grooves at the outer rims of the tire tread are slanted relative to a tire axis at an angle of 3° to 15°. The groove center lines of the transverse grooves of the center tread block rows are slanted relative to the tire axis at an angle of 15° to 50° whereby the transverse grooves create a design of transversely arranged elongated S-shaped grooves.

In order to provide a new tire tread which improves the concurrent properties of longevity, anti-skidding on wet surfaces, hydroplaning and noise reduction, it is suggested to provide the center tread block rows with alternating T-shaped and S-shaped tread blocks.

21 Claims, 3 Drawing Sheets

FIG — 1

TIRE TREAD

BACKGROUND OF THE INVENTION

The present invention relates to a tire tread of a vehicular tire, which, in a peripheral tire direction, has a plurality of tread block rows that are separated from one another by wave-shaped longitudinal grooves arranged essentially in the peripheral tire direction, whereby individual tread blocks within each individual tread block row, are separated form one another by transverse grooves. The transverse grooves are arranged such that in a left tread half as well as in a right tread half the transverse grooves are aligned with one another. The groove center lines of the transverse grooves at the outer rims of the tire tread are slanted relative to the tire axis at an angle of 3° to 15° and the groove center lines of the transverse grooves of center ones of the tread block rows are slanted relative to the tire axis at an angle of 15° to 50° whereby the transverse grooves create a design of transversely arranged elongated S-shaped grooves.

Tire treads of the above cited prior art are known from the following publications: "Neue Reifenzeitung", vol. 1989, pp. 42-59; and "Gummibereifung", vol. 10, 1988, p. 52, upper right hand corner. These prior art tire treads are "symmetric" and do not require special attention with respect to the direction of travel of the vehicle. These conditions are a prerequisite for novel designs of tire treads as demanded by automobile manufacturers. In this context, the term "symmetric" as used in the tire industry does not refer to the term "symmetry" in a geometric sense. It refers to identical rolling properties, clockwise and counter-clockwise, of the tire independent of its mounting.

Further prior art tire treads are disclosed in the Italian journal "PNEURAMA", vol. 4, 1988, p. 41, lower figure, left and center tire. The positive tire tread at the shoulders of these tires transmute directly, without any separation into the positive profile of the outer tread block row. In "Gummibereifung", vol. 2, 1979, p. 71, lower right corner, a diagonal tire for cross-country motorcycles is shown.

It is an object of the present invention to provide a new tire tread which improves and unites the concurrent properties such as the wear characteristics, antiskid characteristics on wet surfaces, hydroplaning characteristics and a low noise level, especially for an economical tire for use under fair conditions, having preferably a radial carcass and being useable at speeds up to 190 km/h (118 m.p.h.).

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
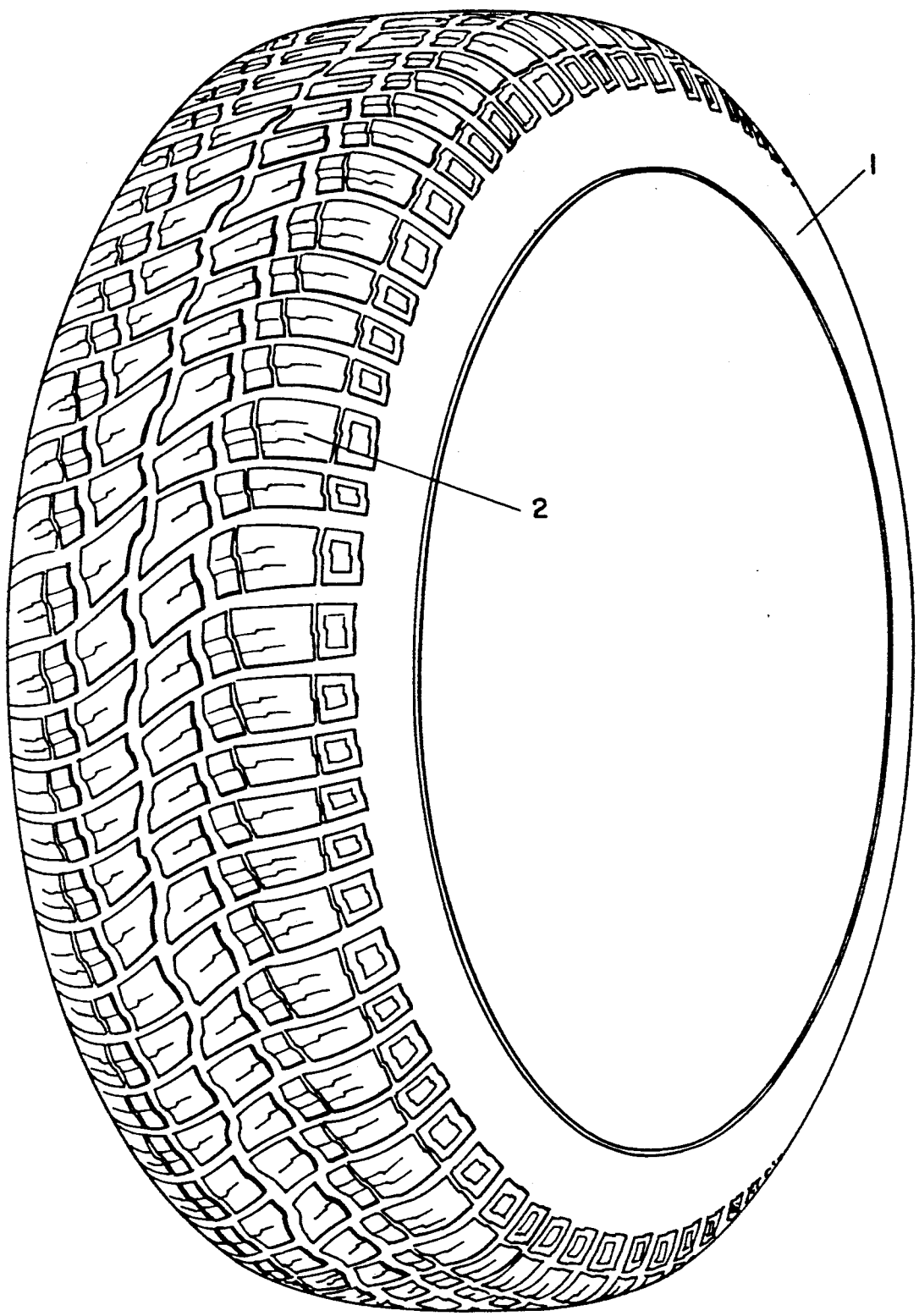
FIG. 1 is a perspective view of a pneumatic vehicular tire of the present invention.

The tire tread for vehicular tires of the present invention is primarily characterized by each one of the center tread block rows comprising S-shaped and T-shaped tread blocks that are arranged in an alternating fashion. It is understood, that the center tread block rows have even-numbered tread design units.

In the following specification, the term "side edges" refers to the edges of the tread blocks that are disposed essentially in the peripheral tire direction and the term "face edges" describes the edges of the tread block that have a major component perpendicular to the peripheral tire direction.

The term "S-shaped tread blocks" in this context means that those tread blocks have two oppositely arranged S-shaped, curved side edges which run essentially parallel to one another. The two other edges, the face edges, are also disposed parallel to one another and are slanted at an angle of 15° to 50° relative to the tire axis. The T-shaped tread blocks, that are alternating with the S-shaped tread blocks in the center tread block rows, differ from the S-shaped tread blocks in that the S-shaped, curved, opposite side edges of the tread blocks are not parallel but mirror-symmetrical to one another. This results in an important feature: one of the two face edges, which are slanted at an angle of 15° to 50°, is substantially longer than the other. The difference in length should be between 25% and 45% of the length of the shorter one of the tread blocks. These two face edges are essentially parallel to one another.

The T-shaped tread blocks have their name derived from their outline which corresponds to the bold-faced capital letter "T". In the specification, the horizontal line of the "T" will be referred to as the "cross bar", while the vertical line of the "T" will be called "support bar". In the inventive T-shaped tread blocks the supporting bar is essentially parallel to the peripheral tire direction, while the cross bar is slanted relative to the tire axis at an angle of 15° to 50°. The employment of the T-shaped tread blocks has proven to be the deciding factor in preventing pronounced peaks in the excitation spectrum of the tire tread in rolling noise determinations.

In a preferred embodiment of the present invention the slanted cross bar of each of the T-shaped blocks in one of the center tread block rows, in the direction of travel, is arranged before the support bar of the same tread block, while the slanted cross bar of the T-shaped blocks of the second center tread block row, viewed in the direction of travel, is arranged behind its respective support bar. This means that preferably the T-shaped tread blocks in each of the two adjacent center tread block rows are arranged in an opposite direction: while in one center tread block row all the "T's" are disposed upright, in the adjacent row all of them are disposed upside down.

The design idea of the aforementioned embodiment is further improved by arranging the oppositely disposed T-shaped tread blocks of the center tread block rows essentially adjacent to one another relative to the tire axis, thereby forming pairs of T-shaped treads blocks, that are separated by a groove. The groove comprises a first outer section, a middle section and a second outer section. The outer sections are arranged parallel to the peripheral tire direction and the middle section is disposed at an angle of between 30° to 70° relative to the outer sections. The corners between two of the respective adjacent sections are rounded.

By this design the T-shaped tread blocks intermesh along the separating profile groove. The cross bar of the T-shaped tread blocks of the right center tread block row extends to the left to the same amount as the cross bar of the T-shaped tread blocks of the left center tread block row extend to the right. The crimping of the groove separating the two T-shaped tread blocks corresponds to 50% to 110% of the width of that groove. The intermeshing of the T-shaped tread blocks permits an especially even force distribution from the tire to the street despite the different lengths of the face edges of the tread blocks. Also, the lateral forces are perfectly and evenly distributed.

In analogy to the intermeshing arrangement of the T-shaped tread blocks, the S-shaped tread blocks of the center tread block rows are preferably arranged such that they are disposed essentially adjacent to one another along the tire axis thereby forming pairs of S-shaped tread blocks. The pairs of tread blocks are separated by a groove. This groove comprises a first outer section, a middle section and a second outer section. The outer sections are arranged parallel to the peripheral tire direction and the middle section is disposed at an angle of between 30° to 70° relative to the outer sections. The corners between each two of the adjacent sections are rounded. The crimping of the center groove section is oriented opposite to the crimping between the two T-shaped tread blocks. The intermeshing of the T-shaped tread blocks which is especially important for the stiffness of the tire tread, together with the described intermeshing of the S-shaped tread blocks, permits an especially even drainage efficiency resulting in favorable hydroplaning characteristics.

The preferred combination of the above described features results in a wave-shaped longitudinal groove between the two center tread block rows. The wave length of the longitudinal groove extends over two tread blocks or two tread profile units of the tire tread. Although it is known in the prior art to equalize the excitation spectrum of the tire by elongating the periodic length of some of the sound actions versus the length of the tread profile unit, the special feature of the present invention, however, is that this design measure is realized in only one longitudinal peripheral groove, i.e., the center tread groove. Accordingly, the new finding, which is surprising to persons skilled in the art of tire design and manufacture, that the best spectrum distribution is not achieved (as was previously believed) by an equal distribution of tread grooves having a single and double wavelength but instead by employing only very few long waved grooves. Persons skilled in the art explain this phenomenon as follows: the subjective hearing of a person does not perceive the sound actions resulting from the short-waved tread grooves, in the presence of wave lengths that are longer by an integral factor and result from other tread grooves, as individual tones but as overtones corresponding to the frequencies resulting from the long-waved tread grooves. Thus the subjectively perceived strength of these lower frequencies is increased. It is especially advantageous to provide only one peripheral groove in the form of a long-waved meander. In asymmetric tire tread designs, this long-waved tread groove is preferably arranged off-center, but according to the object of the present invention of providing a symmetric tire, the single long-waved groove must be the center groove.

An inventive tire tread comprises preferably six tread block rows which, in a straight forward rolling motion of the tire, are forming the contacting surface of the tire to the roll surface. The inventive tire has provided at the two outer rims a further shoulder tread block row which, upon the straight forward rolling motion of the tire, do not contact said roll surface. The tread blocks of the outer tread block rows which form the contacting surface preferably extend into the area of the tire shoulders.

Another embodiment of the present invention comprises a tire tread according to claim 1 having on both sides a respective outer tread block row which does not extend or insignificantly extends to the shoulder of the tire, and, in an inward axial direction, having a further tread block row. The tread blocks of these adjacent tread block rows are separated by transverse grooves which have 30% to 50% of the depth of the other grooves. These shallow grooves do not primarily serve to improve drainage (this is not necessary due to the excellent hydroplaning behavior of the inventive tire tread), but serve the purpose of rendering the surface more flexible during operation. By restricting the groove depth to half the amount of the main grooves of the tire tread, the flexibility is limited in order to avoid unnecessary distortion which would otherwise increase the rolling resistance and the tire temperature during operation. Also, these grooves are advantageous in markedly reducing the noise level compared to a tire tread not having these grooves. In view of the counteracting requirements of a tire tread, limiting these grooves to half the depth of the main grooves is a very advantageous compromise.

In a further advantageous embodiment, the transverse grooves, at the outer rims of the tire treads, open in a trumpet-like manner in an outward direction of the tire axis, thereby optimizing the water drainage in the direction of the tire axis.

Another preferred embodiment is characterized by the tire being formed as a pneumatic tire having a radial carcass and belt layers, and having further tread elements on at least one shoulder which, in a straight forward rolling motion of the tire under normal operating pressure, do not contact the roll surface. The shoulder has a negative profile surface of at least 40%.

In the specification, "negative profile" refers to such portions of the tire tread that are, when the tire is new, sunken relative to the tread portions at the outer most periphery of the tire, the "positives". Accordingly, each groove is a negative. The negative ratio is the ratio of the sunken portions to the sum of the negative and the positive portions of the tire tread.

The use of tread elements on both shoulders of radial tires, especially automobile tires, is well known. Besides design considerations, it is also important that these tread elements provide excellent curb and edge climbing characteristics (despite small diameters of the wheel) by eliminating the danger of rupturing the carcass or the edges of the belt layers. Curb climbing characteristics are important for driving up and down curbs at an acute angle which is especially important when parking. Shoulder tread elements have the purpose of preventing abrasion at the sensitive carcass and the belt edges when approaching the curb or other obstacles. (For safety reasons, a tire must not be used anymore after the carcass or one of the belt layers have been damaged.)

The elasticity and hysteresis of the rubber mixture for the tire shoulder and their tread elements result in substantial distortion in the shoulder tread elements. In radial tires, the heating due to distortion affects the axial rims of the belt layers. In order to provide a sufficient wear resistant strength at this sensitive location, it is necessary to reduce the maximum speed at which the tires may be operated. The tread elements therefore reduce the high speed strength of tires, but, in the daily operation of a vehicle, these tread elements are necessary. On the other hand, the known method for minimizing the distortion forces in the area of the belt layer edges by providing tread elements at the tire shoulders results in an increased noise level during rolling, including low frequency portions that are noticeable in the passenger compartment.

In order to provide a suitable tire having an increased high speed strength and a low noise level during rolling, it is suggested to provide shoulder tread elements, comprising a recess surrounded by an elevated rim, whereby the tread elements are separated from the tread blocks of the outer tread block rows by circumferential grooves that have a depth corresponding essentially to a distance measured from the bottom of the recess to the elevated rim.

The term "rim" in the wording "elevated rim" is not strictly a borderline, without surface area or volume, in the geometric sense of the word, but is understood as a three-dimensional structure. Instead of "rim", one could also use the term "wall".

The recesses in the shoulder tread blocks help to reduce the total mass of the rubber in the tire shoulders. This results in reduced material expenses, but, in particular, it also results in a temperature reduction during operation in the areas of the belt layer edges, which are especially important for the aging characteristics of the tire. Due to the increased cooling surface area, the distortion forces in the tire tread are reduced.

The elevated rim of these tread elements having a reduced mass are, however, successful in protecting the tire shoulder against abrasion of the carcass and the belt layer edges when approaching a curb. The reduction of the amount of rubber volume, which is usually available for abrasion as a protective means during the drive up or down the curb, is compensated for by the improved climbing characteristics of the new shoulder design. Due to the improved wear resistance of the vehicular tire with this particular feature and the reduced material expenses, this feature contributes substantially in providing an economic tire design.

Especially advantageous is the reduction of the noise level. This is contributed, on the one hand, to a reduction in the excitation of oscillations at the area of transmutation between the side walls and the contacting surface of the tire (due to the elastic joint-like connection between the two components), and, on the other hand, to the reduction in the impedance of the sound conduction from the contacting surface to the side walls and then via the wheel rim to the wheel suspension and to the automobile body (due to the separating groove which is essentially oriented in the peripheral tire direction).

The tire tread with its tread elements as described above also provides a wear indicator which is especially important for the typical operation of a vehicle in city traffic. When the elevated rim of the shoulder tread element is worn off, the tire should be replaced for safety reasons. Wear indicators of the prior art provide means to detect only the abrasion of the contacting surface of the tire which rolls on the street surface under normal driving conditions (normal air pressure, driving in a straight forward direction, correct weight on the tires).

Preferably the recesses in the shoulder tread elements have a depth of 0.7 to 2 mm. This range assures an especially favorable ratio between the abrasion protection of the belt layer edges and the distortion forces. The depth of the separating groove is preferably between 100% and 150% of the depth of the recess in the shoulder tread elements.

In a further embodiment of the present invention the recess, the bottom of which is preferably plane is slanted relative to the tire circumference such that, at its end facing the contacting surface, the recess has a depth increased by approximately 20% in comparison to its end facing the tire bead. The depth of the separating grooves should be at least as great as the average depth of the recess.

Expediently, the tread elements of the tire shoulders are designed such that the elevated rim of each one of the tread elements is formed as a closed ring, preferably a non-circular ring, which is separated from all other elevated portions of the tire surface by negative portions such as longitudinal or transverse grooves. Due to their ring-like design, the tread elements, which may be referred to as miniature tread blocks with respect to their height, are almost as stiff as the massive tread blocks with respect to tangential forces exerted on them, but do not compromise the desired flexibility in a perpendicular direction. The arrangement without any connections between the tread elements of the tire shoulder ascertains excellent curb climbing characteristics.

A further embodiment is characterized by tread elements in the form of a square having four communicating tread element edges, with a first and a second tread element edge being arranged essentially perpendicular to the peripheral tire direction, and with a third and a fourth tread element edge being essentially oriented parallel to the peripheral tire direction. The third and fourth tread elements have, at approximately half their length, a crimping of their edges by 25% to 65% of a width of the elevated rims. The first and second tread element edges are preferably arranged at an angle of 75° to 87° relative to the peripheral tire direction. The slight crimping of the third and fourth edges that are essentially arranged parallel to the peripheral tire direction equalizes the rubber flow in the vulcanizing mold. The essentially orthogonal alignment according to the radial and the peripheral direction of the tire permits a favorable self-cleaning of the negative portions of the tire shoulders due to centrifugal forces.

Preferably, each of the recesses, at a bottom thereof, is plane and the bordering edges of the recesses, in a plan view, are parallel to the respective inner elevated rims. It is known that the flanks of negative portions connect preferably in a rounded fashion to the bottom of the recesses in order to prevent notching effects by having sharp edges. When these roundings must be designed especially large or when the recess bottom is not plane, it is favorable, in changing the aforementioned design, to have the bottom contour lines of the recess essentially parallel to the inner border edges of the elevated rims. The parallel arrangement of the edges or contour lines results in a favorable compromise between the desired maximized reduction of the rubber volume and the desired maximized resistance of the shoulder tread elements against abrasion.

DESCRIPTION OF PREFERRED EMBODIMENTS

The present invention will now be described in detail with the aid of one specific embodiment utilizing FIGS. 1 through 4

The vehicular pneumatic tire 1 represented in FIG. 1 is equipped with a tire tread 2.

It is customary among persons skilled in the art to use the term "tire tread" also for the shoulder tread block row, if present, i.e., a tread block row which under normal operation do not contact the street surface. In this specification, the term "tire tread" is used accordingly.

Figure 2:
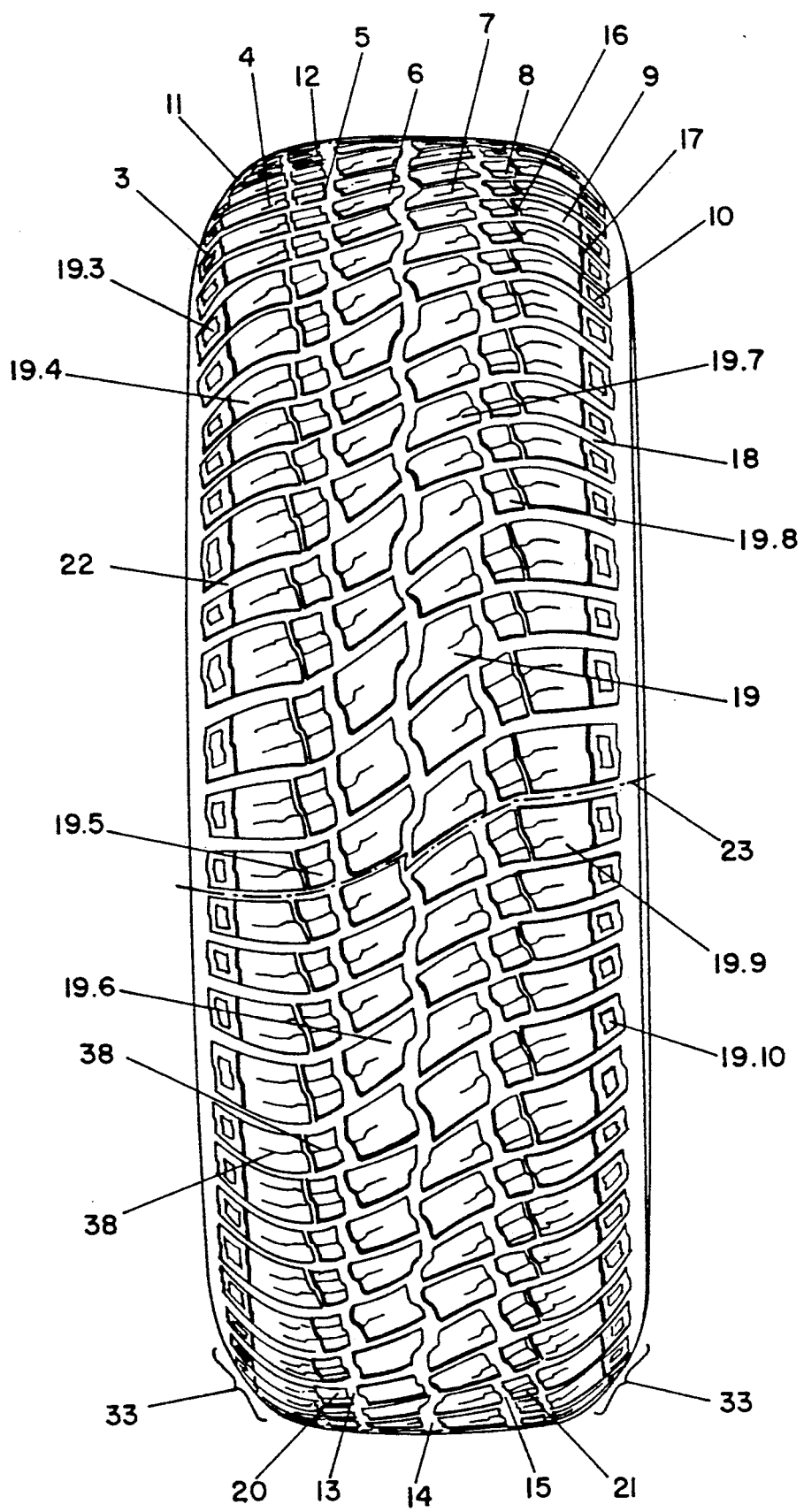
FIG. 2 is a plan view of the tire of FIG. 1.

The FIGS. 1 and 2 show tire edges in the outer periphery of the tire 1. In order to simplify the drawing, the contours at the bottom of the tread, i.e, the transition between the groove bottom and the tread block flanks are not shown. To improve the wear resistance of the tire 1, the transitions are rounded in a well known manner.

FIG. 2 represents a tire 1 according to the present invention in a plan view. The inventive tire tread is provided with tread block rows 3, 4, 5, 6, 7, 8, 9, 10. The tread block rows 3, 10, due to their sole expanse in the area of the tire shoulders 33 are addressed as the shoulder tread block rows. The tread block rows 4 and 9 are the outer tread block rows, while the tread block rows 5 and 8 are called intermediate rows. The tread block rows 6, 7 are called center tread block rows because they border at the center line of the tire.

In general, the tread blocks are given the numeral 19. The tread blocks of the shoulder rows are specifically designated by the numerals 19.3, the tread blocks of the outer rows 4 are given the numeral 19.4 and so on. In the center tread block rows 6, 7 this marking procedure is not sufficient because the contour of the tread block is only repeated with every other tread block. According to the above given scheme, the T-shaped tread blocks of the center row 6 are designated by the numeral 19.6 and the T-shaped tread blocks of the center row 7 are given the numeral 19.7. The S-shaped tread blocks are given the numeral 28, with the tread blocks in the center row 6 being designated by 28.6 and those in the center row 7 being designated by 28.7. Between the shoulder row 3 and the outer tread block row 4 a peripheral longitudinal groove 11 is disposed. The groove 11 is crimped to a small extent at every tread profile unit 19.3, 19.4, approximately at the middle of their peripheral extension, the tire tread blocks 19.3, 19.4 being aligned with respect to one another along the tire axis. In analogy to the left tire half 20 the right tire half 21 is provided with a longitudinal groove 17 between the tread block rows 10 and the outer tread block row 9.

Between the each tread block 19.4 of the outer row 4 and each tread block 19.5 of the intermediate row 5 respective short grooves 12' are provided. A special feature of these grooves 12' is that they have only half the depth of the other grooves. When half the tread is worn off, the adjacent tread blocks 19.4 and 19.5 become one respectively wide tread block. The fine grooves 38 of adjacent tread blocks 19.4 and 19.5 are aligned such that they transmute once half the tread is worn off. When all the short grooves 12' between adjacent tread blocks 19.4, 19.5 are considered along the circumference of the tire, a longitudinal groove 12 is observed. A special feature of the longitudinal groove 12 is that the bottom of the groove 12 alternates between two levels: where transverse grooves 18 are provided the groove 12 has the full depth of the other grooves.

Much like the longitudinal groove 11 the longitudinal groove 12, which separates the tread blocks 19.4, 19.5, is crimped at every tread block 19.4 and 19.5, approximately at the middle of their peripheral extension, the tread blocks 19.4 and 19.5 being aligned with one another along the tire axis. Furthermore, the individual grooves 12' that extend over the length of a tread profile unit are slanted relative to the peripheral direction of the tire in an opposite direction to the transverse grooves 18 between the tread blocks of the rows 6 and 7. The oblique rolling effect caused by the grooves 18 that are disposed between the center rows 6 and 7 and are arranged in an evenly slanted fashion that is non-symmetric relative to the tire axis is partially compensated for by the oppositely oriented grooves 12' relative to the longitudinal groove 12. The sections of the longitudinal groove 13 contribute also to the compensation effect. The sections of the groove 13 differ from the sections 12' of the groove 12 essentially by having the full depth and also double the width. Otherwise, they are designed essentially identical.

The longitudinal groove 16 between the outer row 9 and the intermediate row 8 is designed in an analogue fashion. The longitudinal groove 15 between the intermediate row 8 and the center row 7 is designed identical to the longitudinal groove 13.

Without having a symmetrical arrangement with respect to the tire axis, the transverse grooves 18 are uniformly slanted. In each of the tire tread halves 20 and 21 the transverse groove sections are aligned to form monotonously curved transverse grooves 18 extending over the entire width of the tire tread. The orientation of the curve differs in each of the tire tread halves 20 and 21. The transverse grooves 18 of the left tire tread half 20 are arranged in a radially symmetric manner relative to the transverse grooves 18 of the right tire tread half 21. Along the center longitudinal groove 14 the transverse grooves 18 are not aligned but are staggered by close to 20% of the length of the tread profile units in the peripheral tire direction. This staggering has proven to be essential in the reduction of the overtone spectrum and is a further embodiment of the tire tread of claim 1. For one of the transverse grooves 18 the center groove line 23 is represented in FIG. 2, which is the reference line for the angles given in the preamble of claim 1. The slanting angle at the contacting surface rim 22 is approximately 5° and at the zenith approximately 35°.

Figure 3:
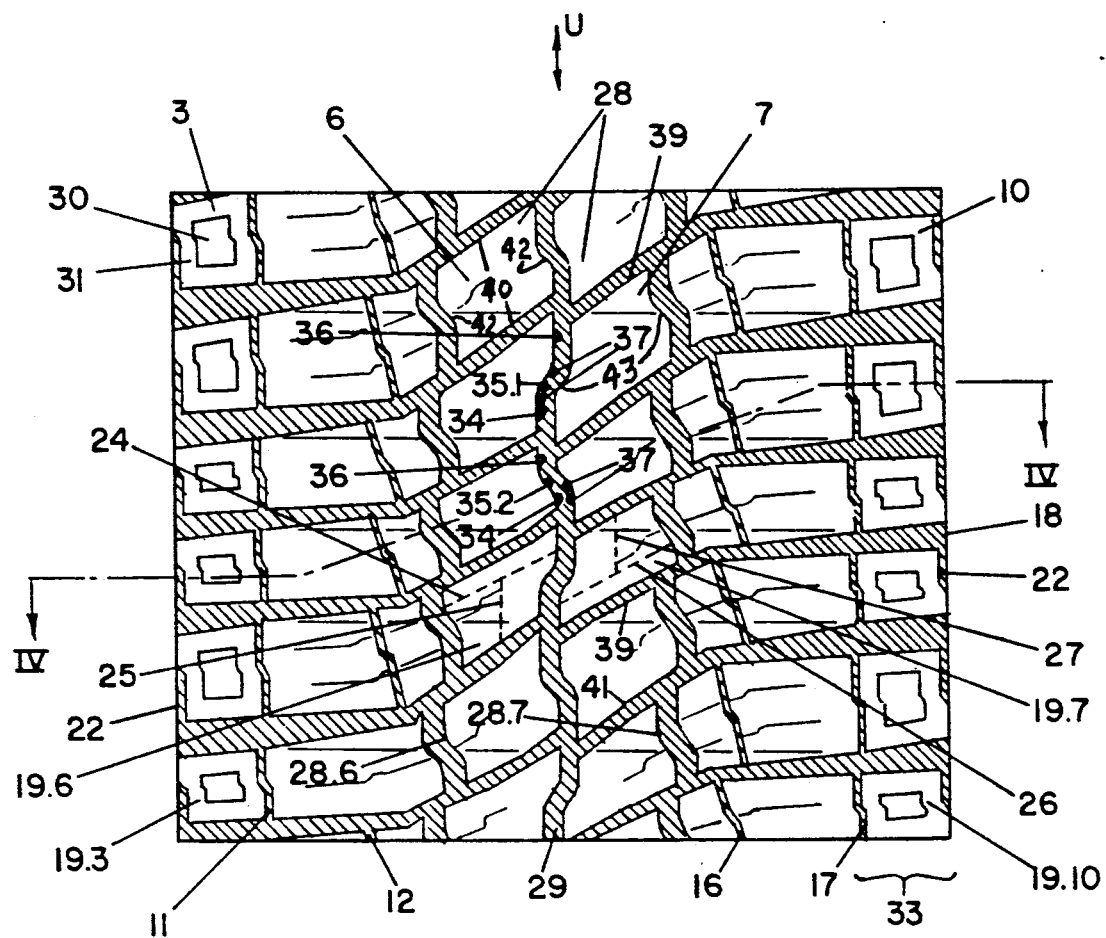
FIG. 3 is a developed projection of the tire tread of the present invention.

In FIG. 3, the elevated portions of the contacting surface of an inventive tire 1 are represented in white, while the recessed portions are represented in black. The center tread block rows 6, 7 are provided with alternating S-shaped and T-shaped tread blocks. The design of the T-shaped tread blocks 19.6, 19.7 is explained in more detail in FIG. 3. In order to clarify the designations used, a "T" is drawn as a dashed line inside one of t he T-shaped tread blocks in each one of the rows 6, 7. In row 6, the "T" is upright, while in row 7, the "T" is upside down. The tread block sections that correspond to the vertical lines 24 and 26 of the "T's", are called the cross bars of the tread block and are provided with the same numeral. Accordingly, the supporting bars of the tread blocks are designated by the numerals 25 and 27 of the imaginary "T" in dashed lines.

The two face edges 40 of each one of the S-shaped tread blocks 28 are essentially of the same length due to the parallel arrangement of their crimped, S-shaped side edges 42. However, this is not true for the T-shaped tread blocks 19.6 and 19.7 due to the mirror-symmetrical arrangement of the crimped, S-shaped side edges 43. The T-shaped tread blocks 19.6, 19.7 are provided with a short 39 and a long face edge 41. It is important to note that each section of the transverse groove 18 between tread blocks 19.6, 19.7, 28.6, 28.7 of the center rows 6, 7 has two bordering tread block edges of different lengths. In an alternating sequence, the transverse grooves 18 in the area of the center rows 6, 7 are limited by the edge pairs 39/40 and 40/41, whereby the symbol "l" corresponds to the length with the numerals of the corresponding edge used as indices:

$$l_{39} < l_{40} < l_{41}.$$

For each groove the two sound actions for the tread block contact and release from the street surface occur. During slow travelling speed, the two phenomena may be registered by the ear as two distinct sounds. When the two sounds differ, the resulting noise, in a subjective evaluation, is considered less disturbing.

At the rims 22 of the tire tread the transverse grooves 18 open in a trumpet-like manner. This design improves the hydroplaning and noise characteristics of the tire.

The tread blocks of the shoulder tread block 3 and 10 have recesses 30, that are surrounded by an elevated rim 31. In comparison to the known solid rubber tread blocks, the rubber volume subjected to distortion is reduced in an area subject to high deformations thus reducing distortion forces while increasing the cooling surface area at the same time. This results in a temperature reduction at the very sensitive edges 45 of the belt layers 44. A loosening between the belt layers 44 or between belt layer 44 and the radial carcass 46 (monolayer in the represented tire 1) is therefore less likely. Of special importance are the separating grooves 11 and 17 between the tread elements 19.3, 19.10 and 19.4, 19.9 of the outer tread block rows 4, 9.

Figure 4:
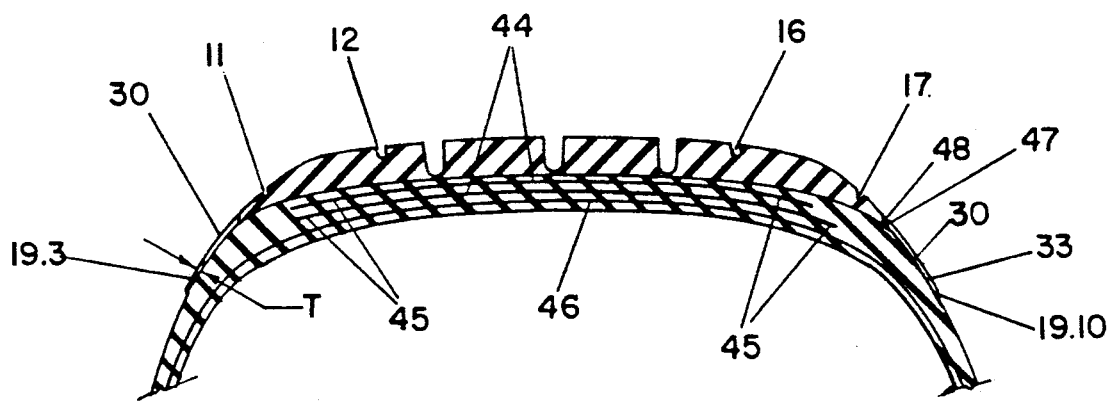
FIG. 4 is a cross-section of the inventive tire tread of the pneumatic tire of the present invention.

FIG. 4 shows a cross-section of the inventive tire tread 2 of the tire 1. The reduced depth of the grooves 12 and 16 as well as the depth T of the recesses 30 of the shoulder tread blocks 19.3 and 19.10 are shown. The bottom of the recess 30 in this embodiment is parallel to the tire periphery at a depth of 1.4 mm. The depth of the separating grooves 11 and 17 is 1.8 mm. The depth of the separating grooves 11 and 17 is of the same magnitude as the depth T of the recess 30. Preferably, the depth of the separating groove is 100% to 150% of the depth T of the recess 30.

The temperature reduction of the edges 45 of the belt layers 44 of the radial carcass 46 provides for an increased wear resistance of the belt assembly and also increases the maximum speed at which the tire may be operated. In contrast to the known tire designs for the reduction of the rubber volume in the tire shoulder that is subjected to distortion, the tire tread of the present invention according to claim 13 provides noise reduction, reduced sound transfer and improved curb climbing characteristics. This is achieved by the separation of the shoulder tread blocks from one another and from the outer, adjacent tread block rows. Furthermore, the tires of the present invention provide a simple and effective safety measure because they indicate the wear of the tire shoulder.

The inventive tires have excellent all-round characteristics. They are easily mounted, have a high longevity, have excellent hydroplaning characteristics and a low noise level.

The present invention is, of course, in no way restricted to the specific disclosure of the specification, examples and drawings, but also encompasses any modifications within the scope of the appended claims.

What we claim is:

1. A vehicular tire with a tire tread having, in a peripheral tire direction, a plurality of tread block rows that are separated from one another by wave-shaped longitudinal grooves arranged essentially in said peripheral tire direction, whereby individual tread blocks, within each individual tread block row, are separated from one another by transverse grooves, with said transverse grooves being arranged such that within a left tread half as well as within a right tread half said transverse grooves are aligned with one another, with groove center lines of said transverse grooves at outer rims of said tire tread being slanted relative to a tire axis at an angle of 3° to 15° and with said groove center lines of said transverse grooves of center ones of said tread block rows being slanted relative to said tire axis at an angle of 15° to 50° whereby said transverse grooves create a design of transversely arranged elongated S-shaped grooves, the improvement wherein:

each one of said center tread block rows comprises S-shaped and T-shaped tread blocks that are arranged in an alternating fashion, said S-shaped blocks defined by two parallel oppositely arranged S-shaped, curved side edges running in the peripheral tire direction, and said T-shaped blocks defined by a slanted cross bar and a support bar, said slanted cross bar is oriented in the transverse direction of said tread.

2. A vehicular tire with a tire tread according to claim 1, in which said slanted cross bar of a first given one of said T-shaped tread blocks of a first one of said center tread block rows, viewed in a direction of travel, is arranged before said support bar, oriented in said peripheral tire direction, of said first given T-shaped block, with said slanted cross bar of a second given one of said T-shaped blocks of a second one of said center tread block rows, viewed in said direction of travel, being arranged behind said support bar, oriented in said peripheral tire direction, of said second given T-shaped block.

3. A vehicular tire with a tire tread according to claim 2, in which said oppositely disposed T-shaped blocks of said center tread rows are essentially arranged adjacent to one another in a direction of said tire axis and are forming tread block pairs such that said tread block pairs are separated by a first longitudinal groove portion comprising a first outer section, a middle section and a second outer section, with said outer sections being arranged parallel to said peripheral tire direction and with said middle section being disposed at an angle of between 30° to 70° relative to said outer sections and with corners between said adjacent sections being rounded.

4. A vehicular tire with a tire tread according to claim 3, in which said S-shaped blocks of said center tread block rows are essentially arranged adjacent to one another in a direction of said tire axis and are forming tread block pairs such that said tread block pairs are separated by a second longitudinal groove portion comprising a first outer section, a middle section and a second outer section, with said outer sections being arranged parallel to said peripheral tire direction and with said middle section being disposed at an angle of between 30° to 70° relative to said outer sections and with corners between said adjacent sections being rounded.

5. A vehicular tire with a tire tread according to claim 4, in which said middle sections of said first grooves between said T-shaped blocks are bent in an opposite direction than said middle sections of said second grooves between said S-shaped blocks.

6. A vehicular tire with a tire tread according to claim 5, in which, between said center tread block rows, a wave-shaped longitudinal groove is disposed, having a wave length that extends over two tread blocks of the tire tread in said peripheral tire direction, with an amplitude A of said longitudinal groove being 50% to 110% of a width of said longitudinal groove.

7. A vehicular tire with a tire tread according to claim 1, in which each of said T-shaped blocks is bordered, in said peripheral tire direction, by curved side edges that are mirror-symmetrical to one another, and by an essentially straight first longer face edge and an essentially straight shorter face edge, which are parallel to one another and are disposed at an angle of 15° and 50° relative to said tire axis, with said first longer face edge being 25% to 45% longer than said second shorter face edge.

8. A vehicular tire with a tire tread according to claim 7, in which a length of said second shorter face edge of said T-shaped blocks is smaller than a length of an essentially straight face edge of said S-shaped blocks, with said length of said straight face edge of said S-shaped blocks being smaller than a length of said first longer face edges of said T-shaped blocks.

9. A vehicular tire with a tire tread according to claim 1, in which six tread block rows are provided which, in a straight forward rolling motion of said tire, are forming a contacting surface of said tire to said roll surface, having provided at said two outer rims a further shoulder tread block row which upon said straight forward rolling motion of said tire do not contact said roll surface.

10. A vehicular tire with a tire tread according to claim 1, having in an outward direction of said tire axis an outer tread block row which essentially does not extend to a tire shoulder and has, in an inward direction of said tire axis, an adjacent tread block row, with said tread blocks of said adjacent tread block rows being separated by grooves which have a depth of between 30% to 55% of said transverse grooves.

11. A vehicular tire with a tire tread according to claim 1, in which, at said outer rims of said tire treads, said transverse grooves open in a trumpet-like manner in an outward direction of said tire axis.

12. A vehicular tire with a tire tread according to claim 1, in which said tire is formed as a pneumatic tire having a radial carcass and belt layers, with further tread elements on at least one shoulder which, in a straight forward rolling motion of said tire under normal operating pressure, do not contact the roll surface, with said shoulder having a negative profile surface of at least 40%.

13. A vehicular tire with a tire tread according to claim 12, in which each tread element comprises a recess surrounded by an elevated rim, and with said tread elements being separated from said tread blocks of said outer tread block rows by circumferential grooves that have a depth corresponding essentially to a distance measured from a bottom of said recess to said elevated rim.

14. A vehicular tire with a tire tread according to claim 13, in which said distance is approximately 0.7 to 2 mm.

15. A vehicular tire with a tire tread according to claim 13, in which said elevated rim of each of said tread elements is a closed ring, which is separated from all other elevated parts of said tire tread by a negative profile in the form of ones of said longitudinal and transverse grooves.

16. A vehicular tire with a tire tread according to claim 15, in which said closed ring is non-circular.

17. A vehicular tire with a tire tread according to claim 13, in which a bottom contour line of said recess is essentially parallel to inner border edges of said elevated rim.

18. A vehicular tire with a tire tread according to claim 13, in which said bottom of said recess is essentially plane, and outer border edges of each recess, in a plan view, are parallel to said inner border edges of said respective elevated rim.

19. A vehicular tire with a tire tread according to claim 13, in which said tread elements are essentially of a square shape having four communicating tread element edges, with a first and a second tread element edge being arranged essentially perpendicular to said peripheral tire direction, and with a third and a fourth tread element edge being essentially oriented parallel to said peripheral tire direction which third and fourth tread elements have, at approximately half their length, a crimping of said edges by 25% to 65% of a width of said elevated rims.

20. A vehicular tire with a tire tread according to claim 19, in which said first and said second tread element edge are arranged at an angle of 75° to 87° relative to said peripheral tire direction.

21. A vehicular tire with a tire tread according to claim 1, in which said transverse grooves along a longitudinal center groove are staggered by 15% to 20% of a length of a tread design unit in said peripheral tire direction.

* * * * *